US006885943B2

(12) United States Patent
Bittar et al.

(10) Patent No.: US 6,885,943 B2
(45) Date of Patent: Apr. 26, 2005

(54) SIMULTANEOUS RESOLUTION ENHANCEMENT AND DIP CORRECTION OF RESISTIVITY LOGS THROUGH NONLINEAR ITERATIVE DECONVOLUTION

(75) Inventors: Michael S. Bittar, Houston, TX (US); Guoyu Hu, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 29 days.

(21) Appl. No.: 10/251,045

(22) Filed: Sep. 20, 2002

(65) Prior Publication Data

US 2004/0059513 A1 Mar. 25, 2004

(51) Int. Cl.[7] .................................................. G01V 3/18
(52) U.S. Cl. .................................. 702/7; 702/6; 702/9
(58) Field of Search ..................................... 702/7, 6, 9

(56) References Cited

U.S. PATENT DOCUMENTS

| | | | | |
|---|---|---|---|---|
| 5,184,079 A | * | 2/1993 | Barber | 324/339 |
| 5,862,269 A | * | 1/1999 | Cohen et al. | 382/304 |
| 5,867,806 A | | 2/1999 | Strickland et al. | 702/7 |
| 6,047,240 A | * | 4/2000 | Barber et al. | 702/10 |
| 6,304,086 B1 | | 10/2001 | Minerbo et al. | 324/338 |
| 6,502,036 B2 | * | 12/2002 | Zhang et al. | 702/7 |
| 6,606,565 B1 | * | 8/2003 | Strickland et al. | 702/7 |
| 6,611,762 B1 | * | 8/2003 | Gao | 702/7 |

OTHER PUBLICATIONS

PCT Search Report for International Application No. PCT/US03/29082, dated Mar. 17, 2004, 4 p.

* cited by examiner

Primary Examiner—Marc S. Hoff
Assistant Examiner—Anthony Gutierrez
(74) Attorney, Agent, or Firm—Conley Rose, P.C.

(57) ABSTRACT

A nonlinear iterative deconvolution method and system. In one embodiment, the system comprises a data acquisition module, a storage module, and a processing module. The data acquisition module obtains logging data from measurements made by a sensor tool moving through a borehole, and stores the logging data in the storage module. The processing module processes the logging data to determine a formation model by iteratively updating a set of formation model values which correspond to a set of positions along the borehole. The iterative updating includes (i) calculating an error value; and (ii) applying a linearizing factor to the error value. The iterative updating may be expressible as a weighted sum of a current formation model value with a product of the error value and the linearizing factor. The iterative updating may continue until an adequate match between the logging data and a calculated tool response is achieved.

31 Claims, 8 Drawing Sheets

SIMULTANEOUS RESOLUTION ENHANCEMENT AND DIP CORRECTION OF RESISTIVITY LOGS THROUGH NONLINEAR ITERATIVE DECONVOLUTION

BACKGROUND

Modern petroleum drilling and production operations demand a great quantity of information relating to parameters and conditions downhole. Such information typically includes characteristics of the earth formations traversed by the wellbore, along with data relating to the size and configuration of the borehole itself. The collection of information relating to conditions downhole, which commonly is referred to as "logging", can be performed by several methods.

In conventional oil well wireline logging, a probe or "sonde" housing formation sensors is lowered into the borehole after some or all of the well has been drilled, and is used to determine certain characteristics of the formations traversed by the borehole. The upper end of the sonde is attached to a conductive wireline that suspends the sonde in the borehole. Power is transmitted to the sensors and instrumentation in the sonde through the conductive wireline. Similarly, the instrumentation in the sonde communicates information to the surface by electrical signals transmitted through the wireline. Since the sonde is in direct electrical contact with the surface installation, the communications delay is negligible. Accordingly, measurements can be made and communicated in "real time".

A disadvantage of obtaining downhole measurements via wireline is that the drilling assembly must be removed or "tripped" from the drilled borehole before the desired borehole information can be obtained. This can be both time-consuming and extremely costly, especially in situations where a substantial portion of the well has been drilled. In this situation, thousands of feet of tubing may need to be removed and (if offshore) stacked on the platform. Typically, drilling rigs are rented by the day at a substantial cost. Consequently, the cost of drilling a well is directly proportional to the time required to complete the drilling process. Removing thousands of feet of tubing to insert a wireline logging tool can be an expensive proposition.

As a result, there has been an increased emphasis on the collection of data during the drilling process. Collecting and processing data during the drilling process eliminates the necessity of removing or tripping the drilling assembly to insert a wireline logging tool. It consequently allows the driller to make accurate modifications or corrections as needed to optimize performance while minimizing down time. Designs for measuring conditions downhole including the movement and location of the drilling assembly contemporaneously with the drilling of the well have come to be known as "measurement-while-drilling" techniques, or "MWD". Similar techniques, concentrating more on the measurement of formation parameters, commonly have been referred to as "logging while drilling" techniques, or "LWD". While distinctions between MWD and LWD may exist, the terms MWD and LWD often are used interchangeably. For the purposes of this disclosure, the term LWD will be used with the understanding that this term encompasses both the collection of formation parameters and the collection of information relating to the movement and position of the drilling assembly.

A number of measurement techniques have been used in wireline and/or LWD measurements. These include, among others, induction, resistivity, permittivity, magnetic permeability, acoustic speed, nuclear magnetic resonance (NMR), gamma radiation (GR) and thermal neutron delay (TMD) measurement techniques. One issue that logging tools making these measurements must address is relative dip. The borehole typically intersects formation beds at an angle other than the ideal ninety degrees. Consequently, formation boundaries intersect the borehole at an angle, making the transition between formation layers appear more gradual than is actually the case. Techniques exist for measuring formation dip angles and using the dip angle measurements to compensate for dip angle effects on the logging tool measurements.

Another problem with the logging tools that make these measurements is a limited vertical resolution. Each tool has a "tool response" that extends over a measurement region, causing the tool to provide a measurement that represents a weighted average of material properties in that region. This averaging effect "smears" the property measurements, and creates the possibility that fine-resolution features (e.g., thin beds and sharp boundaries) may be missed.

Removal of the smearing effect is known as deconvolution or inversion. Deconvolution is known to be "an ill-posed problem" in that any number of formations could have produced the measured log. The presence of measurement nonlinearities further complicates the deconvolution problem.

A number of inversion techniques exist for removing the smearing effect of the tool response. Several are described in U.S. Pat. No. 5,867,806, entitled "System and Method for Performing Inversion on LWD Resistivity Logs with Enhanced Resolution," by R. W. Strickland, et al, which is hereby incorporated by reference.

"Forward Deconvolution" is a preferred technique for enhancing tool resolution. In the forward deconvolution technique, an approximate or estimated model of the formation is made from the data logs. This model of the formation is essentially an estimate of the characteristics of the formation. After the model of the formation is generated, a computer model of the tool response is used to transform the estimated model of the formation into an estimated log. This estimated log is then compared with the actual log data. One or more parameters of the formation model are then adjusted based on this comparison of the estimated log to the actual log data, a new estimated log is calculated, a new comparison is made, and the process repeats. Thus, the forward deconvolution technique iteratively refines the formation model until the simulated log approximates the actual log. This technique can be computationally intensive, but may offer some advantages over other inversion approaches. Among these potential advantages are flexibility and stability in the presence of nonlinearities.

The existing inversion techniques have been found to yield inadequate resolution, in that thin beds are routinely overlooked. These thin beds may contain retrievable oil or other hydrocarbons. An inversion technique that offers improved resolution without instability would be desirable.

SUMMARY

The problems outlined above are in large measure addressed by a nonlinear iterative deconvolution method and system. In one embodiment, the system comprises a data acquisition module, a storage module, and a processing module. The data acquisition module obtains logging data from measurements made by a sensor tool moving through a borehole, and stores the logging data in the storage module. The processing module accesses the storage module to retrieve and process the logging data to determine a formation model. The processing module iteratively updates a set of formation model values which correspond to a set of positions along the borehole. For each formation model value in the set, the iterative updating includes (i) calculating an error value; and (ii) applying a linearizing factor to the error value. The iterative updating may be expressible as a weighted sum of a current formation model value with a product of the error value and the linearizing factor. The logging data is preferably indicative of formation resistivity. The disclosed system may be applied to logging data from wireline operations and from logging while drilling operations. The updating of the formation model may continue until an adequate match between the logging data and a calculated tool response is achieved.

BRIEF DESCRIPTION OF THE DRAWINGS

A better understanding of the present invention can be obtained when the following detailed description of the preferred embodiment is considered in conjunction with the following drawings, in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Figure 1:
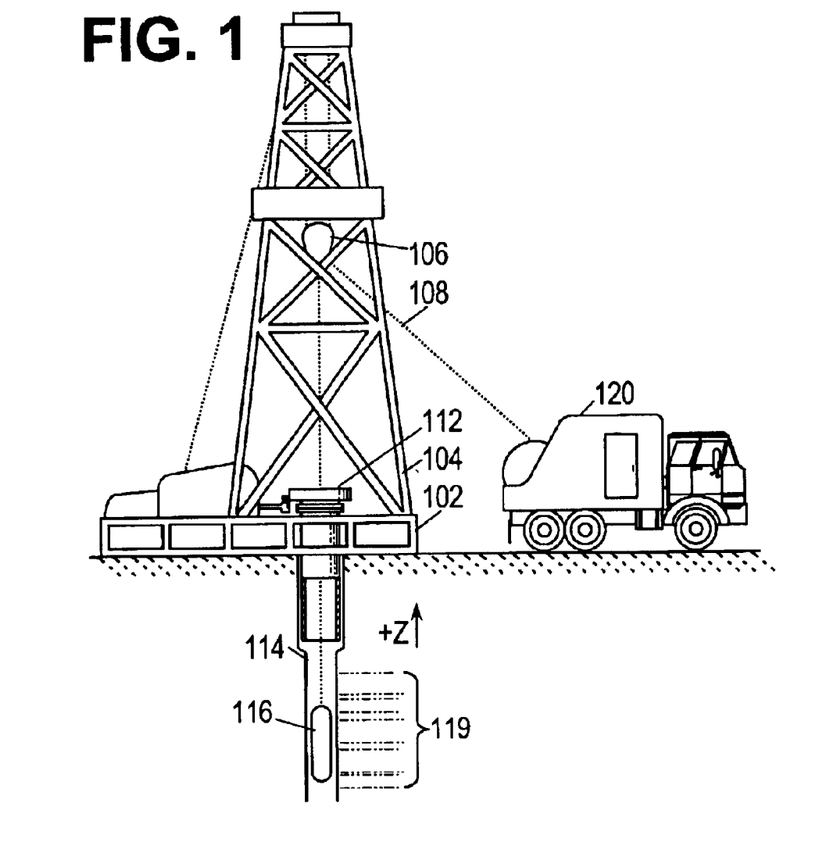
FIG. 1 shows a wireline logging operation on a well.

Turning now to the figures, FIG. 1 shows a well during wireline logging operations. A drilling platform 102 is equipped with a derrick 104 that supports a hoist 106. Drilling of oil and gas wells is commonly carried out by a string of drill pipes connected together so as to form a drilling string that is lowered through a rotary table 112 into a wellbore 114. In FIG. 1, it is assumed that the drilling string has been temporarily removed from the wellbore 114 to allow a sonde 116 to be lowered by wireline 118 into the wellbore 114. Typically, the sonde 116 is lowered to the bottom of the region of interest and subsequently pulled upward at a constant speed. During the upward trip, the sonde 116 performs measurements on the formations 119 adjacent to the wellbore as they pass by. The measurement data is communicated to a logging facility 120 for storage, processing, and analysis. Logging facility 120 may be provided with electronic equipment for performing vertical resolution enhancement signal processing. Similar log data may be gathered and analyzed during drilling operations (Logging While Drilling, or LWD).

The measurement data preferably includes resistivity measurements, conductivity measurements, or other measurements from which formation resistivity may be estimated. In addition, the measurement data preferably includes borehole survey information and/or relative dip measurements, i.e., measurements that indicate the angle at which the borehole intersects boundary planes between formation strata. Note that the relative dip angle may vary due to changes in formation bedding plane orientation and/or changes in borehole direction.

Figure 2:
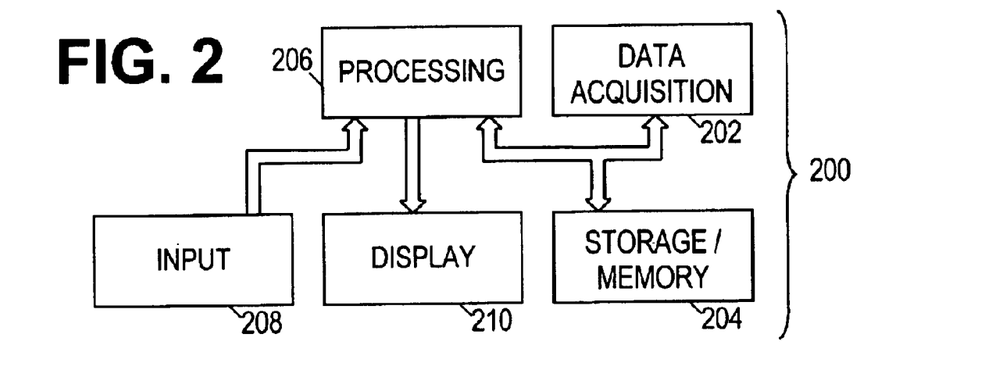
FIG. 2 shows a functional block diagram of a logging data processing system.

FIG. 2 shows an illustrative functional block diagram of a system 200 for analyzing logging data. The system 200 may be contained within a logging facility 120, or alternatively, it may be an external system coupled to the logging facility. In yet another embodiment, it is an entirely separate system to which the logging data is transported.

System 200 includes a module 202 which receives the log data. Module 202 may simply be a port through which the data enters the system, or it may be a more complex module for conditioning and acquiring data signals. The data is stored in a storage module 204, which maintains a copy of the data for access by the processing module 206. Storage module may take the form of dynamic random access memory (DRAM), static random access memory (SRAM), Flash ROM (read only memory), optical storage media, magnetic storage media, or any combination thereof. Note that storage module 204 (or a portion thereof) may be removable so as to be portable between systems. Storage module 204 may further maintain a copy of software for analyzing the data as described further below.

Processing module 206 accepts instructions from a user via input module 208, and responsively operates on the data from storage module 204 to enhance log resolution. The measured log data and/or formation model may be displayed in some form to the user by display module 210.

Resistivity logs, particularly LWD resistivity logs, are subject to nonlinear shoulder effects and nonlinear dip effects. Furthermore, there is a coupling between the two nonlinear effects. System 200 preferably provides a stable and efficient nonlinear deconvolution method which simultaneously accounts for both the shoulder and dipping effect. A preferred method embodiment is described below.

Figures 3, 12:
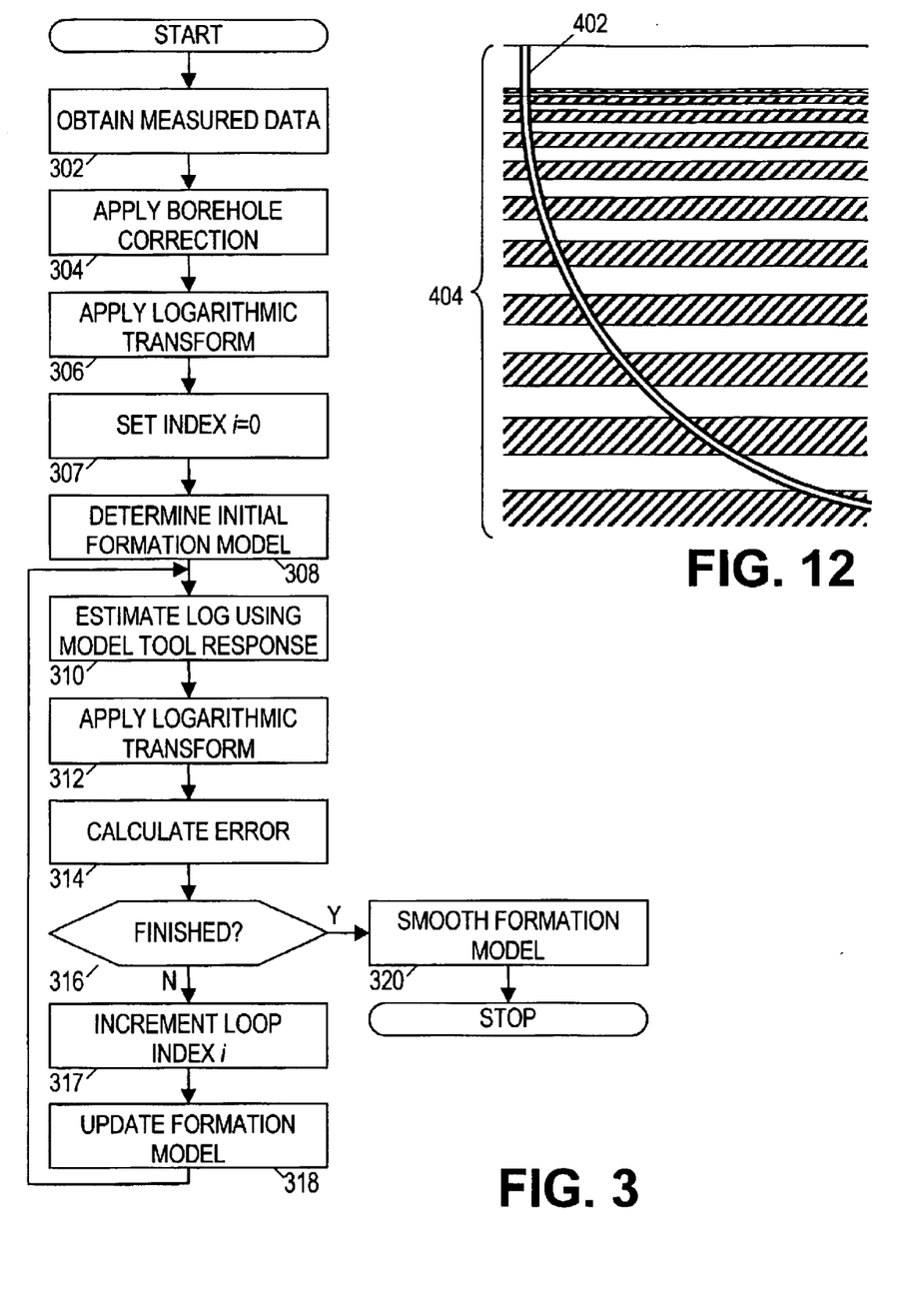
FIG. 3 shows a flowchart of a preferred nonlinear iterative deconvolution method.
FIG. 12 shows a well bore having varying relative dip angles.

FIG. 3 shows a flowchart diagram of a preferred method for deconvolving the measured log data. The preferred method may be implemented as software executed by system 200. In block 302, the measured log data is obtained. The data may be in the form of resistivity (or equivalently, conductivity) measurements made at various positions distributed axially along the borehole. Relative dip measurements at axially distributed positions are preferably included too.

In block 304, the system 200 preferably adjusts the resistivity measurements to correct for the borehole effect. As one of ordinary skill in the art would be aware, the measurements made by most resistivity tools are affected in a determinable way by the fluid in borehole around the tool. The properties of the fluid and the tool are known and can be combined to determine the adjustment for each measurement to compensate for the borehole effect. The output of this block is hereafter denoted $M_j$, where j is an index that ranges over the measurement positions of interest in the borehole. The measurement positions of interest may be all actual measurement positions, equally-spaced (possibly interpolated) positions, or just selected positions. The measurement positions of interest may depend on any number of factors, and may vary between iterations. In the preferred embodiment, the measurement positions are equally spaced with a spacing somewhat smaller than the minimum spatial resolution of the tool. If resistivity measurements are unavailable for the selected measurement positions, they are preferably determined by interpolation between available measurements.

In block 306, the system 200 calculates log $M_j$. The logarithmic transform may employ the natural logarithm or some other base, as desired. In block 307, loop index i is initialized to zero. In block 308, system 200 determines an initial formation model $F_j^i$, where i=0 is the iteration number, and j is again the position index. In one embodiment, the initial formation model is determined in accordance with the inflection point method taught by Strickland in U.S. Pat. No. 5,867,806. However, in a preferred embodiment, the initial formation model is simply:

$$F_j^0 = M_j. \qquad (1)$$

If measurements at multiple depths of investigation are available, the initial formation model is preferably chosen to be the measurements at the shallowest or next-to-shallowest depth of investigation.

In block 310, the system 200 calculates the expected resistivity measurements for the current formation model. Typically, model equations are available to calculate the response of the tool to any given formation. Often these equations are ID (one dimensional) equations that accept formation resistivity as a function of axial position, accept relative dip as a function of axial position, and provide the expected tool measurements as a function of axial position along the borehole. However, more sophisticated model equations are sometimes available and may alternatively be employed. The output of this block is hereafter denoted as $L_j^i$, where i and j have their previously defined meanings.

In block 312, the system 200 calculates log $L_j^i$. In block 314, an error measurement is calculated:

$$\varepsilon^i = \sum_j (\log(M_j) - \log(L_j^i))^2 \qquad (2)$$

This error measurement is indicative of how closely estimated measurements match the actual measurements. In block 316, the system 200 performs a test to determine whether further loop iterations are desired. The test may include determining whether the error measurement is less than a predetermined threshold and/or determining whether a maximum number of iterations have already been performed.

If further iterations are desired, then in block 317, the loop index i is incremented. In block 318, system 200 updates the formation model as provided below:

$$\log(F_j^i) = \begin{cases} \alpha^i \log(F_j^{i-1}) + \beta^i (\log(M_j) - \log(L_j^{i-1})), & \text{for } i = 1 \\ \alpha^i \log(F_j^{i-1}) + \beta^i (\log(M_j) - \log(L_j^{i-1})) \dfrac{\log(F_j^{i-1}) - \log(F_j^{i-2})}{\log(L_j^{i-1}) - \log(L_j^{i-2})}, & \text{for } i > 1, \end{cases} \qquad (3)$$

where $\alpha^i$ and $\beta^i$ are weighting factors that may vary slowly with respect to iteration number i. Note that the fraction in equation (3) provides an approximate linearizing factor that appears to adequately compensate for the nonlinearities typically present in LWD resistivity logs. In a preferred embodiment, the $\alpha^i$ weighting factor is fixed, while the $\beta^i$ weighting factor is monotonically decreasing:

$$\alpha^i = 1 \qquad (4)$$

$$\beta^i = \frac{\pi}{2}(2)^{-i/2}.$$

In an alternative embodiment, both weighting factors are fixed:

$$\alpha^i = 1 \qquad (5)$$

$$\beta^i = 1.1$$

It has been observed that other fixed weighting factor values close to one are suitable as well, and may be preferred. In one embodiment, $\alpha^i$ is fixed at 0.9, and, $\beta^i$ is fixed at 1.3. The weighting factors may be adjusted in accordance with additional experience so as to assure a good trade-off between fast convergence and stability.

After the update in block 318, the method repeats, starting from block 310. Once the system 200 determines in block 316 that enough iterations have been performed, the system smoothes the formation model in block 320. This smoothing may take the form of a Gaussian filter, although other smoothing filters may be used if desired. This smoothing serves to remove high frequency artifacts and noise that may appear in the updated formation model.

Figure 4:
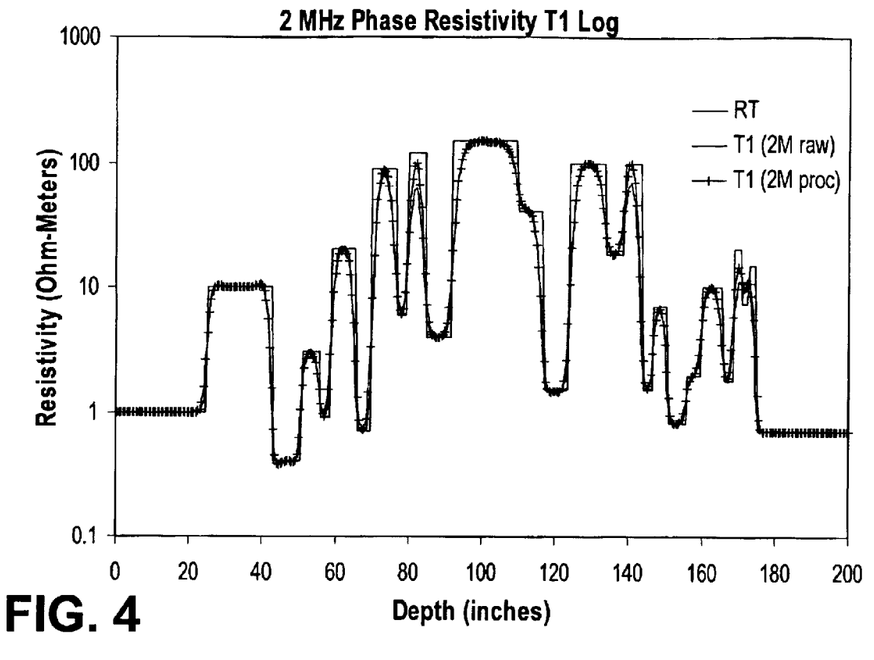
FIG. 4 shows a graph of exemplary 2 MHz, T1 phase resistivity logging data for the "Oklahoma" formation.

FIG. 4 shows a graph of true formation resistivity (RT) vs. depth in a known formation. Superimposed on this graph are the 2 MHz phase resistivity log measurements taken at a shallow depth ("T1 2M raw"). The dip angle is zero. Also shown is the curve for the enhanced resistivity log ("T1 2M proc.") which is the smoothed formation model determined by applying the disclosed method to the T1 2M raw data. Note that the resistivity of the narrow beds is much closer to the true value.

Figure 5:
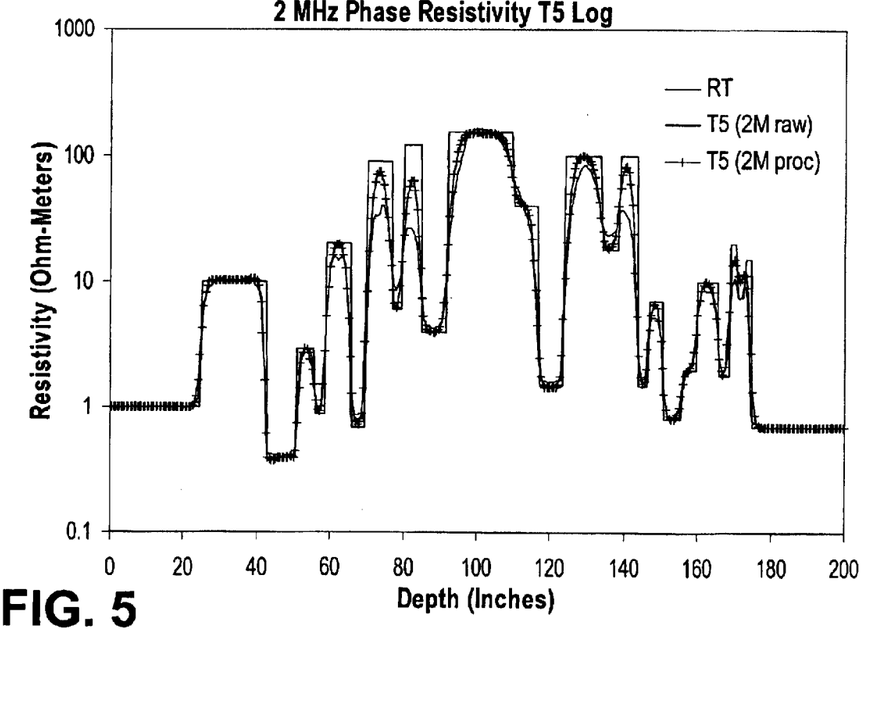
FIG. 5 shows a graph of exemplary 2 MHz, T5 phase resistivity logging data.
Figure 6:
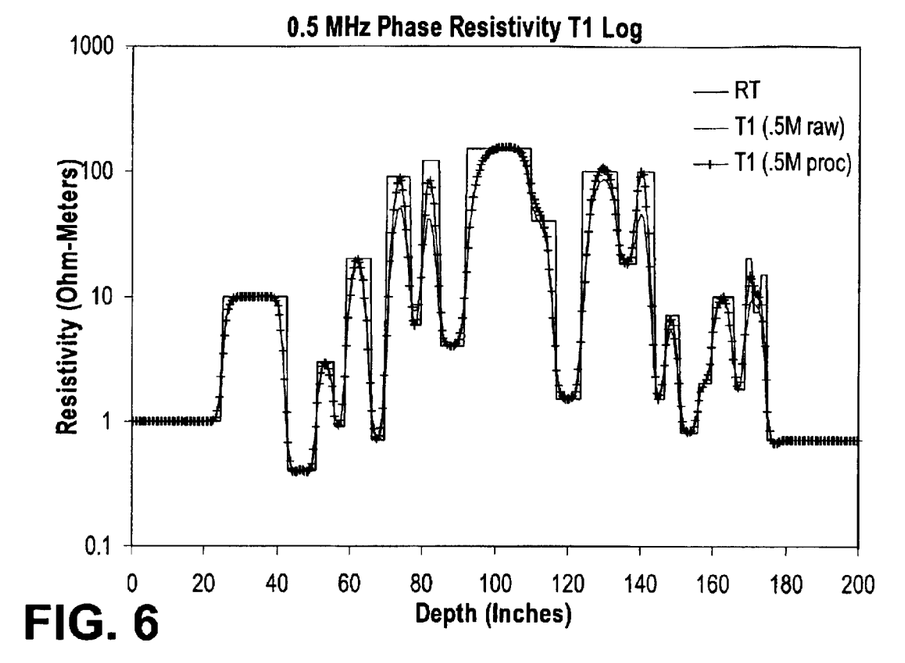
FIG. 6 shows a graph of exemplary 0.5 MHz, T1 phase resistivity logging data.
Figure 7:
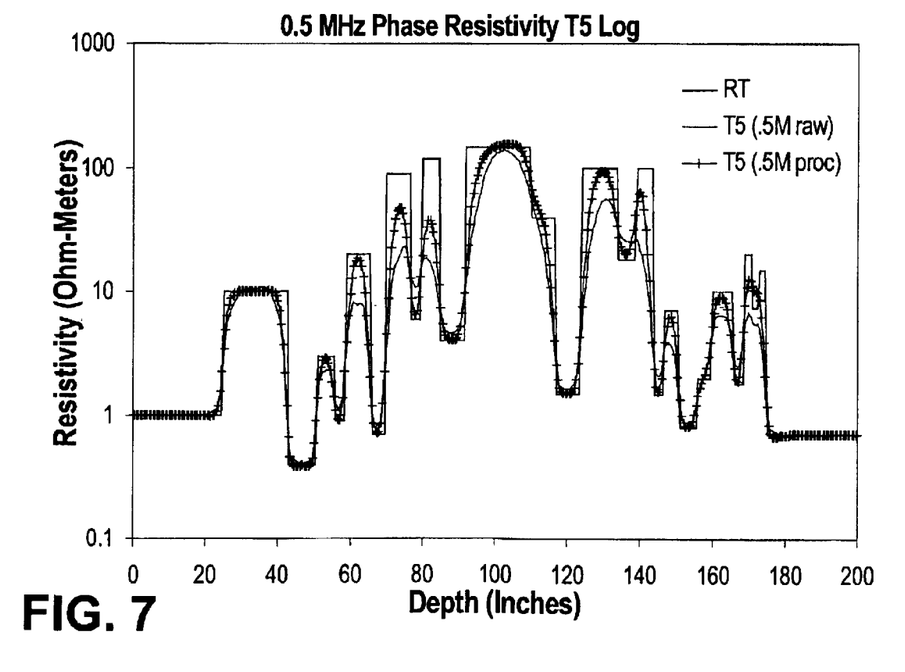
FIG. 7 shows a graph of exemplary 0.5 MHz, T5 phase resistivity logging data.
Figure 8:
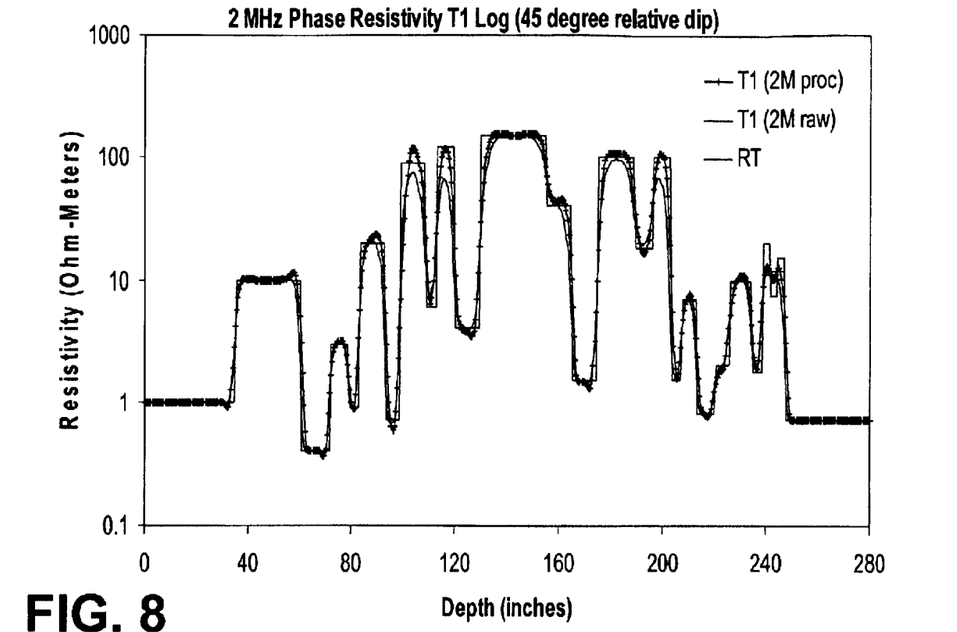
FIG. 8 shows a graph of exemplary 2 MHz, T1 phase resistivity logging data with a 45° dip angle.
Figure 9:
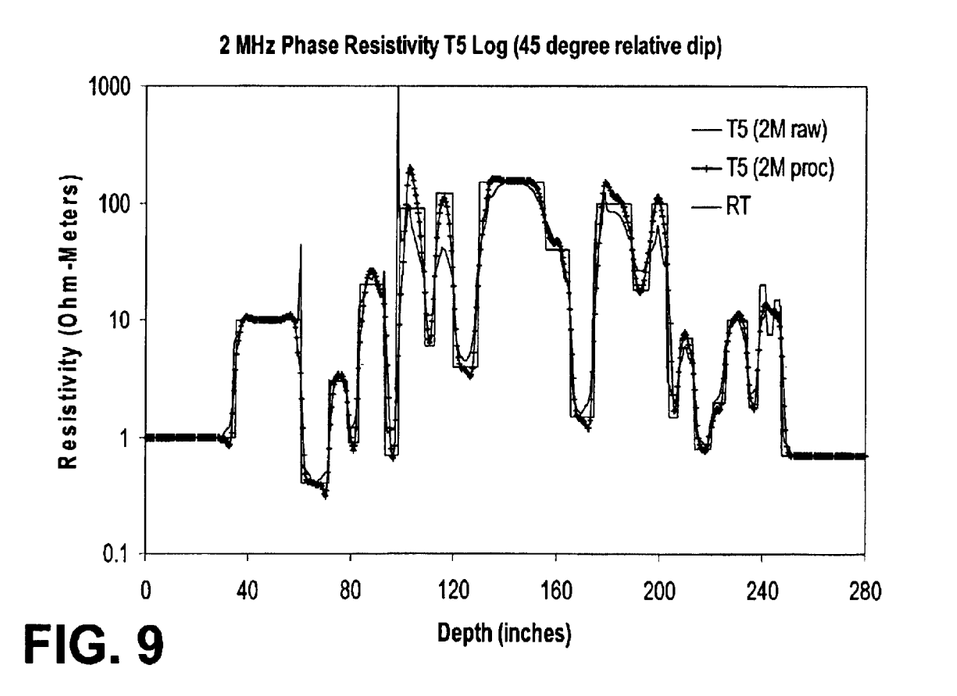
FIG. 9 shows a graph of exemplary 2 MHz, T5 phase resistivity logging data with a 45° dip angle.
Figure 10:
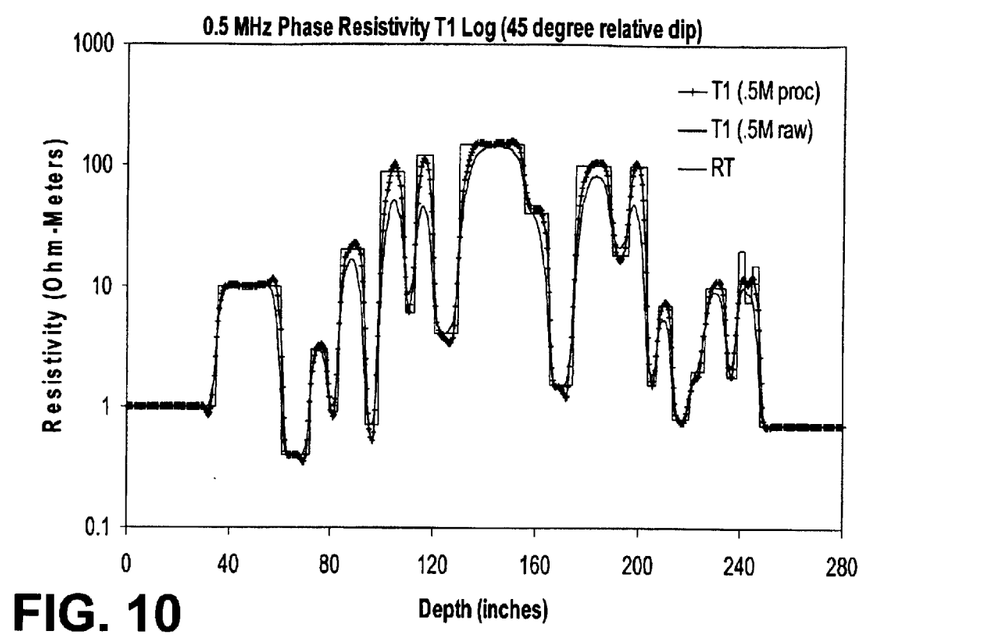
FIG. 10 shows a graph of exemplary 0.5 MHz, T1 phase resistivity logging data with a 45° dip angle.
Figure 11:
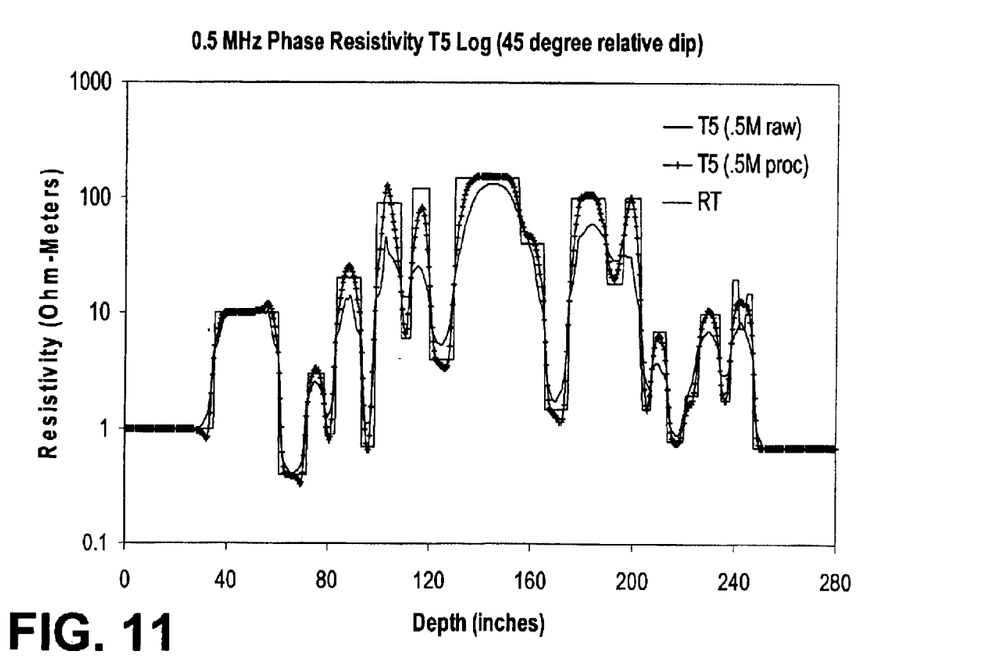
FIG. 11 shows a graph of exemplary 0.5 MHz, T5 phase resistivity logging data with a 45° dip angle.

FIG. 5 shows a similar graph for the 2 MHz phase resistivity log measurements taken at a deep depth of investigation ("T5 2M raw"). The initial formation model was set equal to the T1 2M raw curve. The results of the enhancement process are even more dramatic in this figure. FIG. 6 shows a similar graph for the 500 KHz phase resistivity log measurements taken at a shallow depth, and FIG. 7 shows the results for the 500 KHz phase resistivity log measurements taken at a deep depth of investigation. In all cases the enhancement process provides an improvement in the resolution.

FIGS. 8–11 show graphs corresponding to FIGS. 4–7, but with a constant relative dip angle of 45°. Note that the enhancement process provides simultaneous compensation for both the shoulder effect and the dip effect.

FIG. 12 shows an example of a curved borehole 402 passing through a set 404 of formation beds of gradually increasing thickness. Note that the relative dip varies as a function of position in the borehole. Normally, the measurements of borehole orientation (and hence, relative dip angle) are typically made relatively infrequently. Accordingly, to determine the relative dip at any given point, a continuous borehole path is preferably determined using a minimum curvature method. A detailed discussion of the minimum curvature method is provided in Bulletin on Directional Survey Calculation Method and Terminology, 1st ed., American Petroleum Institute, Dec. 31, 1985, p. 17. This reference is hereby incorporated by reference.

Field survey data generally provides angle of inclination (borehole inclination), magnetic direction angle (borehole azimuth), and course length measurement (measured depth, recorded length of the drill string at a given point), as obtained from the multi-shot survey. To reconstruct the path of the wellbore, several different methods of calculation can be used. In each method, the purpose of the calculation is basically the same. Each method utilizes the measured borehole inclination, the borehole azimuth and the measured depth to arrive at a Vertical Depth, Latitude and Departure for each survey points. The minimum curvature method, uses the vectors defined by inclination and direction measurements, and smoothes them into the wellbore curve. In this method smoothing is done by the use of a ratio factor which is defined by curvature (and dogleg) of the wellbore section. Given the borehole path, only the formation bedding angles are needed for the relative dip calculation. The formation bedding angles are usually determinable from seismic surveys or other sources.

Figure 13:
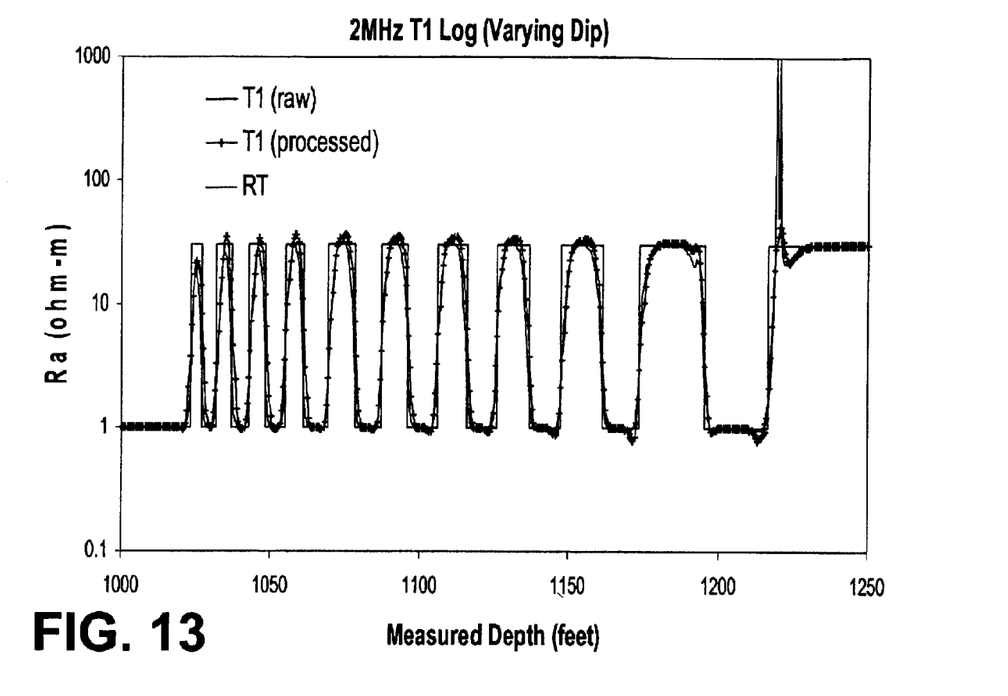
FIG. 13 shows a graph of exemplary 2 MHz, T1 phase resistivity logging data with a varying dip angle.
Figure 14:
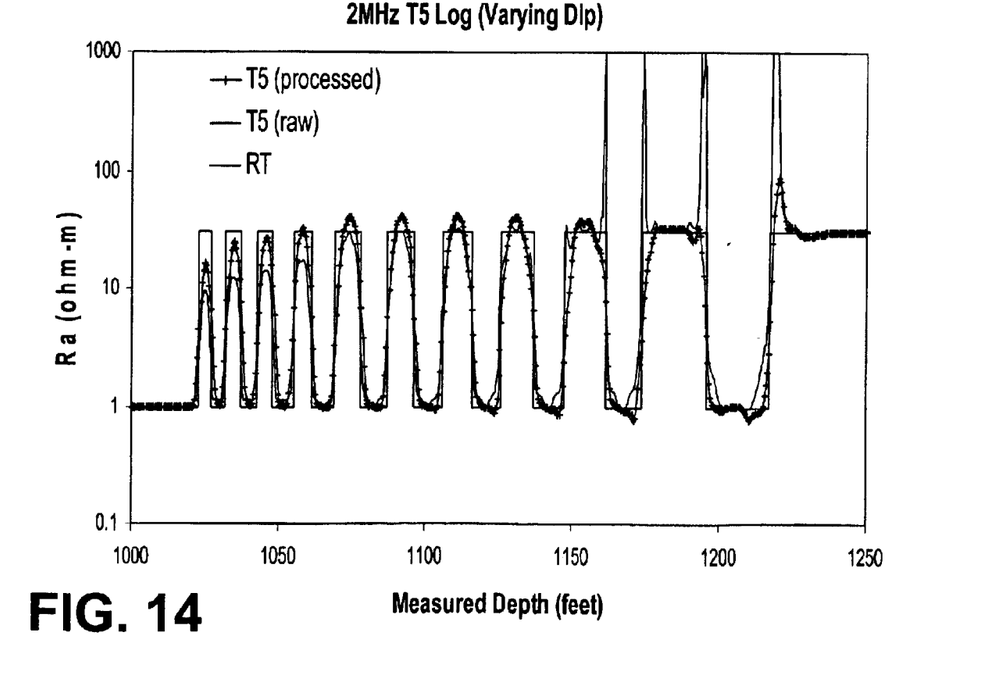
FIG. 14 shows a graph of exemplary 2 MHz, T5 phase resistivity logging data with a varying dip angle.
Figure 15:
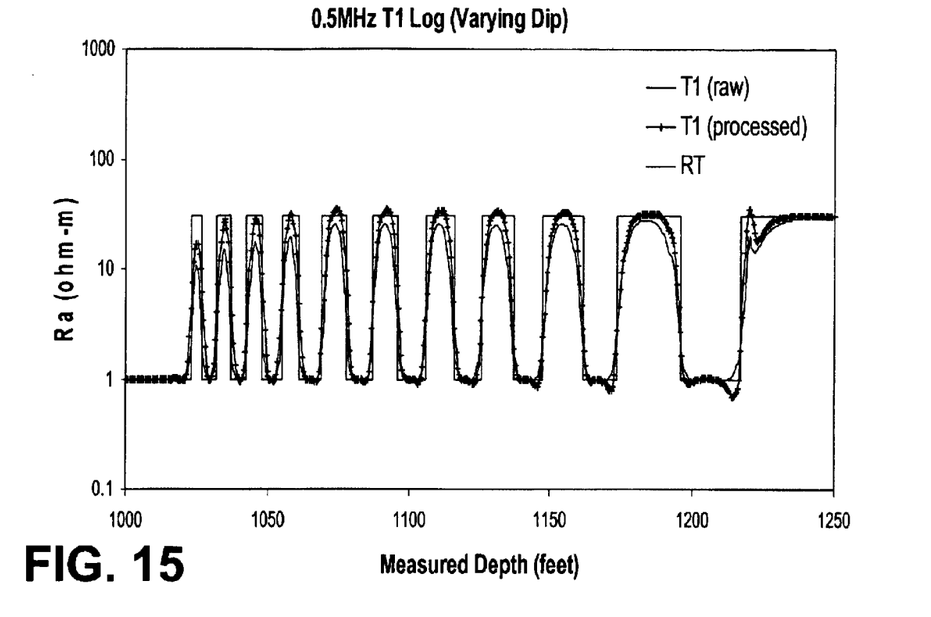
FIG. 15 shows a graph of exemplary 0.5 MHz, T1 phase resistivity logging data with a varying dip angle.
Figure 16:
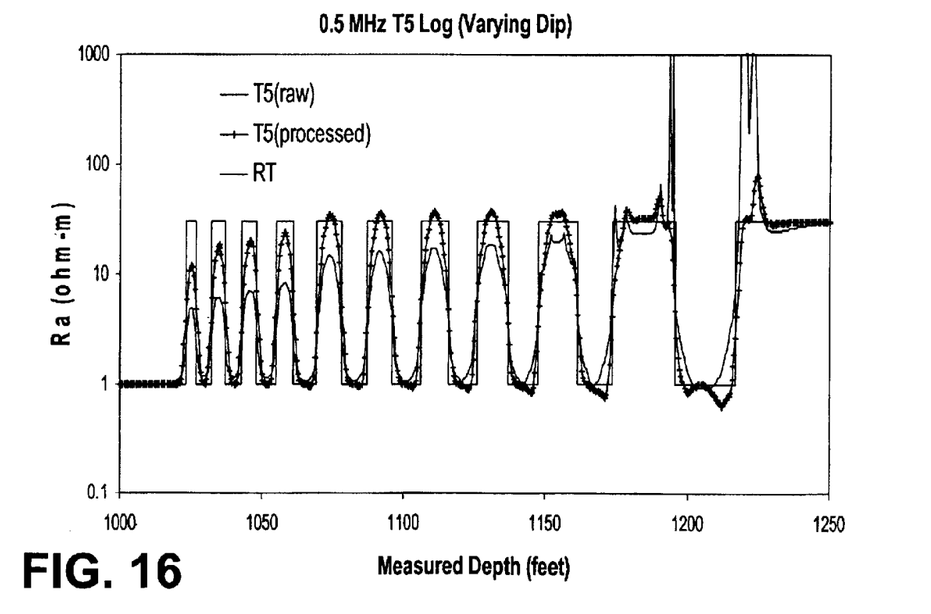
FIG. 16 shows a graph of exemplary 0.5 MHz, T5 phase resistivity logging data with a varying dip angle.

FIGS. 13–16 show graphs of true formation resistivity, simulated resistivity measurements, and enhanced resistivity, as a function of depth for this formation. FIG. 13 shows shallow 2 MHz measurements, FIG. 14 shows deep 2 MHz measurements, FIG. 15 shows shallow 500 KHz measurements, and FIG. 16 shows deep 500 Khz measurements. Note that the enhancement process performs well even in the presence of varying dip angles.

An improved method for enhancing the resolution of logging tool responses has now been disclosed. It is noted that this method corrects for dip and shoulder effects simultaneously, which advantageously accounts for any coupling effects between the two. In addition, the disclosed method is fast, allowing for enhancement of logs at the well site. The disclosed method provides enhanced logs that are conformal with the raw data, i.e., all the features are preserved. Experience indicates that the disclosed method may be more efficient than existing inversion methods, and that it is suitable for processing both induction and galvanic resistivity tool types.

While preferred embodiments of this invention have been shown and described, modifications thereof can be made by one skilled in the art without departing from the spirit or teaching of this invention. The embodiments described herein are exemplary only and are not limiting. Many variations and modifications of the system and apparatus are possible and are within the scope of the invention. Accordingly, the scope of protection is not limited to the embodiments described herein, but is only limited by the claims that follow, the scope of which shall include all equivalents of the subject matter of the claims.

What is claimed is:

1. A method of processing logs to enhance resolution, wherein the method comprises:

obtaining a measurement signal from a sensor tool moving through a borehole; and iteratively updating a formation model until a calculated tool response substantially matches the measurement signal, wherein said updating includes:
calculating an error value;
applying a linearizing factor to the error value; and
determining a product of the error value, the linearizing factor, and a weighting factor.

2. The method of claim 1, wherein the calculated tool response simultaneously accounts for shoulder bed effects and varying relative dip angles.

3. The method of claim 2, wherein the relative dip angles are determined at each measurement point using a minimum curvature borehole path.

4. The method of claim 1, further comprising:

processing the measurement signal to correct for a borehole effect before iteratively updating the formation model.

5. The method of claim 1, wherein the weighting factor decreases in each successive iteration.

6. The method of claim 1, wherein said updating further includes:

determining an updated formation model value from a weighted sum of a current formation model value and a product of the error value and the linearizing factor.

7. The method of claim 1, wherein the error value is expressible as $(\log(M_j)-\log(L^{i-1}_j))$, where $M_j$ is a borehole corrected measurement signal value, and $L^{i-1}_j$ is a current calculated tool response value.

8. The method of claim 1, wherein the linearizing factor is expressible as $$\frac{\log(F_j^{i-1}) - \log(F_j^{i-2})}{\log(L_j^{i-1}) - \log(L_j^{i-2})},$$

where $F_j^i$ is a formation model value in iteration i>1, and $L_j^i$ is a calculated tool response value in iteration i.

9. The method of claim 1, further comprising:

determining an initial formation model before iteratively updating the formation model, wherein the initial formation model is set equal to the measurement signal after the measurement signal has been corrected for the borehole effect.

10. The method of claim 1, further comprising:

determining an initial formation model before iteratively updating the formation model, wherein the initial formation model is set equal to a borehole-effect-corrected shallow resistivity measurement signal.

11. The method of claim 1, wherein the iterative updating of the formation model is expressible as:

$$\log(F_j^i) = \alpha^i \log(F_j^{i-1}) + \beta^i (\log(M_j) - \log(L_j^{i-1})) \frac{\log(F_j^{i-1}) - \log(F_j^{i-2})}{\log(L_j^{i-1}) - \log(L_j^{i-2})},$$

wherein $M_j$ is a measurement signal value that corresponds to a borehole position j, $F_j^i$ is a formation model value in iteration i>1, $L_j^i$ is a calculated tool response value in iteration i, $\alpha^i$ is a first weighting factor, and $\beta^i$ is a second weighting factor.

12. The method of claim 11, wherein $\alpha^i$ is approximately one for all iterations i.

13. The method of claim 1, further comprising:
filtering the formation model after said iterative updating so as to attenuate any high frequency artifacts.

14. The method of claim 1, wherein the sensor tool is a wireline induction resistivity tool having multiple depths of investigation.

15. The method of claim 1, wherein the sensor tool is a logging while drilling resistivity tool having multiple depths of investigation.

16. A system for characterizing formations surrounding a borehole, the system comprising:
a data acquisition module that obtains logging data, said logging data generated from measurements made by a sensor tool moving through a borehole;
a storage module configured to store the logging data; and
a processing module configured to perform operations on the logging data to determine a formation model, wherein said operations include iteratively updating a set of formation model values which correspond to a set of positions along the borehole, wherein for each formation model value in the set, the iterative updating includes:
calculating an error value;
applying a linearizing factor to the error value; and
determining a product of the error value, the linearizing factor, and a weighting factor.

17. The system of claim 16, wherein the logging data is indicative of formation resistivity.

18. The system of claim 16, wherein the sensor tool is a wireline logging sonde.

19. The system of claim 16, wherein the sensor tool is a logging while drilling (LWD) tool.

20. The system of claim 16, wherein the processing module updates the set of formation model values until a calculated tool response matches the logging data, subject to a maximum number of iterations.

21. The system of claim 20, wherein the logging data is corrected for a borehole effect, and wherein the calculated tool response accounts for relative dip of the formations.

22. The system of claim 20, wherein the calculated tool response accounts for shoulder bed effects and varying relative dip angles.

23. The system of claim 20, wherein the relative dip angles are determined at each measurement point using a minimum curvature borehole path.

24. The system of claim 16, wherein the weighting factor decreases additional iterations are performed.

25. The system of claim 16, wherein said iterative updating for each formation model value in the set further includes:
determining an updated formation model value from a weighted sum of a current formation model value and a product of the error value and the linearizing factor.

26. The system of claim 16, wherein the error value is expressible as $(\log(M_j) - \log(L^{i-1}{}_j))$, where $M_j$ is a borehole corrected logging data value, and $L^{i-1}{}_j$ is a current calculated tool response value.

27. The system of claim 16, wherein the linearizing factor is expressible as $$\frac{\log(F_j^{i-1}) - \log(F_j^{i-2})}{\log(L_j^{i-1}) - \log(L_j^{i-2})},$$

where $F_j^i$ is a formation model value in iteration i>1, and $L_j^i$ is a calculated tool response value in iteration i.

28. The system of claim 16, wherein the processing module is further configured to determine an initial formation model before iteratively updating the formation model, wherein the initial formation model is set equal to the logging data after the logging data has been corrected for the borehole effect.

29. The system of claim 16, wherein the iterative updating of the formation model is expressible as:

$$\log(F_j^i) = \alpha^i \log(F_j^{i-1}) + \beta^i (\log(M_j) - \log(L_j^{i-1})) \frac{\log(F_j^{i-1}) - \log(F_j^{i-2})}{\log(L_j^{i-1}) - \log(L_j^{i-2})},$$

wherein $M_j$ is a logging data value that corresponds to a borehole position j, $F_j^i$ is a formation model value in iteration i>1, $L_j^i$ is a calculated tool response value in iteration i, $\alpha^i$ is a first weighting factor, and $\beta^i$ is a second weighting factor.

30. The system of claim 29, wherein $\alpha^i$ is close to one for all iterations i.

31. The system of claim 16, wherein the processing module is further configured to filter the set of formation model values after said iterative updating so as to attenuate any high frequency artifacts.

* * * * *